United States Patent
Baumann et al.

(10) Patent No.: US 7,531,973 B2
(45) Date of Patent: May 12, 2009

(54) WIZARD FOR CONFIGURING A MOTOR DRIVE SYSTEM

(75) Inventors: Kevin L. Baumann, Cedarburg, WI (US); Thomas J. Rehm, Mequon, WI (US); Richard W. Piefer, Brookfield, WI (US); John Joseph Golownia, Jr., Hartford, WI (US); John M. Keller, Milwaukee, WI (US); David Christopher Stringfellow, Buckinghamshire (GB); Michael Robert Keller, Menomonee Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/141,549

(22) Filed: May 31, 2005

(65) Prior Publication Data

US 2006/0267537 A1 Nov. 30, 2006

(51) Int. Cl.
*H02K 29/00* (2006.01)

(52) U.S. Cl. .................. 318/138; 318/254; 318/439

(58) Field of Classification Search .................. 318/362, 318/560–650, 138, 254, 439
See application file for complete search history.

(56) References Cited

U.S. PATENT DOCUMENTS

| | | | | |
|---|---|---|---|---|
| 4,199,814 A | * | 4/1980 | Rapp et al. | 700/180 |
| 5,615,609 A | * | 4/1997 | Hill et al. | 101/183 |
| 5,710,498 A | * | 1/1998 | Yutkowitz et al. | 318/632 |
| 6,470,225 B1 | * | 10/2002 | Yutkowitz | 700/44 |
| 6,590,366 B1 | * | 7/2003 | Browning et al. | 322/49 |
| 6,826,434 B1 | * | 11/2004 | Chang | 700/86 |
| 6,901,335 B2 | * | 5/2005 | Wang et al. | 702/35 |
| 6,943,522 B2 | * | 9/2005 | Nagaoka et al. | 318/632 |

\* cited by examiner

*Primary Examiner*—Karen Masih
(74) *Attorney, Agent, or Firm*—Quarles & Brady, LLP; Alexander R. Kuszewski

(57) ABSTRACT

An electronic line shaft includes a motor drive and a processing unit operable to execute a wizard for configuring the motor drive. The wizard is operable to receive mechanical characteristic data associated with the motor drive, determine a noise parameter based on the mechanical characteristic data, and determine at least one control parameter of the motor drive based on the noise parameter.

24 Claims, 8 Drawing Sheets

WIZARD FOR CONFIGURING A MOTOR DRIVE SYSTEM

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to motor control and, more particularly, to a wizard for configuring a motor drive system.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Rotating motors are typically controlled by a motor drive that receives a reference motor velocity signal and, based on the motor velocity signal, produces and outputs a torque signal that is applied to the motor. Adjustment of the torque signal based on changes to the reference velocity signal relative to a feedback velocity signal ensures that the motor rotates at the reference velocity.

Some applications require precise motor control across multiple, synchronized motors. For example, an electronic line shaft may be employed in a printing application to move the paper or other material over rollers and through various stages of the printing process. Typical printing processes employ multiple colors, each applied at different locations along the line. Hence, to ensure print quality, the various stages are synchronized. A lack of synchronicity between the stations results in misregistration between the colors, leading to unacceptable product that may need to be scrapped.

Previous generations of printing technology employed a mechanical line shaft mechanically linked to the various printing stations. Rotation of the line shaft by an electric motor activated rollers and other printing station tools along the line to conduct the printing process. In a mechanical line shaft system, factors such as play in the mechanical linkages, stretching of the paper web, and torsional flexing of the line shaft itself make it difficult to achieve and maintain synchronicity between the printing stations, especially during periods of acceleration and deceleration of the printing system. It has been observed that when synchronicity is not maintained, product generated includes excessive flaws and is often unacceptable for intended use. Mechanical line shafts also have reduced flexibility in addressing print changes. Hence, where changes are required, down time may be excessive.

More modern printing systems, commonly referred to shaftless printing systems or electronic line shaft systems, employ a plurality of motors and associated rollers that are electrically synchronized, as opposed to mechanically synchronized. Lack of synchronicity in an electronic line shaft results in similar problems, such as color misregistration, evident in a mechanical line shaft system.

When operating a plurality motors synchronously in an automated system, several factors exist that may cause the position of the motors to deviate from each other even though they are all operating pursuant to a single reference velocity signal. For instance, motor inertia between motors at different stations is often non-uniform and can cause one motor to drift from the other motors.

Typical motor drives for controlling motors are implemented using software executed by a central processing unit (CPU). As CPU clock rates have risen, so too has the control bandwidth available to a motor drive. However, higher control bandwidth does not necessarily equate to higher performance. To this end, as control bandwidth increases, so does the susceptibility of a motor drive to noise which can lead to operation, rattles, clunks, tendency to resonate, lack of robust performance, etc. In fact, in many cases, the noise level that results from operating a drive at a maximum bandwidth associated with high CPU clock cycles, instead of increasing control performance has been known to degrade performance appreciably. In this regard, most processes have an ideal operational bandwidth that is much lower than the high bandwidth associated with high speed CPU clock cycles. For example, an ideal operational bandwidth may be one or two orders of magnitude less than the bandwidth associated with high CPU clock cycles.

In a motor control system, control parameters may be specified that affect the performance of the system. For example, controller gain constants or filter coefficients may be varied depending on the type of system employed and the configured system bandwidths. Also, different compensation schemes, such as inertia compensation or adaption, may be selectively employed depending on the particular application. Factors, such as noise, desired accuracy, type of coupling between the motor and the load, motor inertia versus load inertia, etc. may affect the control parameter settings and compensation techniques employed.

The effective selection of control parameters (e.g., gain constants, filter coefficients, compensation techniques) typically requires time-consuming, iterative tuning by highly skilled motor control technicians. Hence, the process of configuring a motor control system is expensive, and the results may vary depending on the skills and experience of the particular individual performing the configuration.

Thus, it would be desirable to automatically configure the control parameters of a motor control system based on the particular nature of the application, obviating the need for an expensive manual tuning procedure with varied efficacy.

BRIEF SUMMARY OF THE INVENTION

The present inventors have recognized that a wizard may be employed to gather information about the particular nature of a motor control system and to automatically configure the control parameters of the motor control system.

One aspect of the present invention is seen in an electronic line shaft including a motor drive and a processing unit operable to execute a wizard for configuring the motor drive. The wizard is operable to receive mechanical characteristic data associated with the motor drive, determine a noise parameter based on the mechanical characteristic data, and determine at least one control parameter of the motor drive based on the noise parameter.

Another aspect of the present invention is seen in a method for configuring a motor drive. The method includes receiving mechanical characteristic data associated with the motor drive. A noise parameter is determined based on the mechanical characteristic data. At least one control parameter of the motor drive is determined based on the noise parameter.

Yet another aspect of the present invention is seen in a printing system including a plurality of printing stations for processing a web. The printing system includes a signal source, a virtual encoder, a plurality of drive units, and a processing unit. The signal source is operable to generate a reference velocity signal. The virtual encoder is operable to generate a reference position signal based on the reference velocity signal. The plurality of drive units are operable to move the web through the printing stations in accordance with the reference position signal and the reference velocity signal. The processing unit is operable to execute a wizard for configuring at least one of the drive units. The wizard is operable to receive mechanical characteristic data associated with the configured drive unit, determine a noise parameter based on the mechanical characteristic data, and determine at least one control parameter of the configured drive unit based on the noise parameter.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
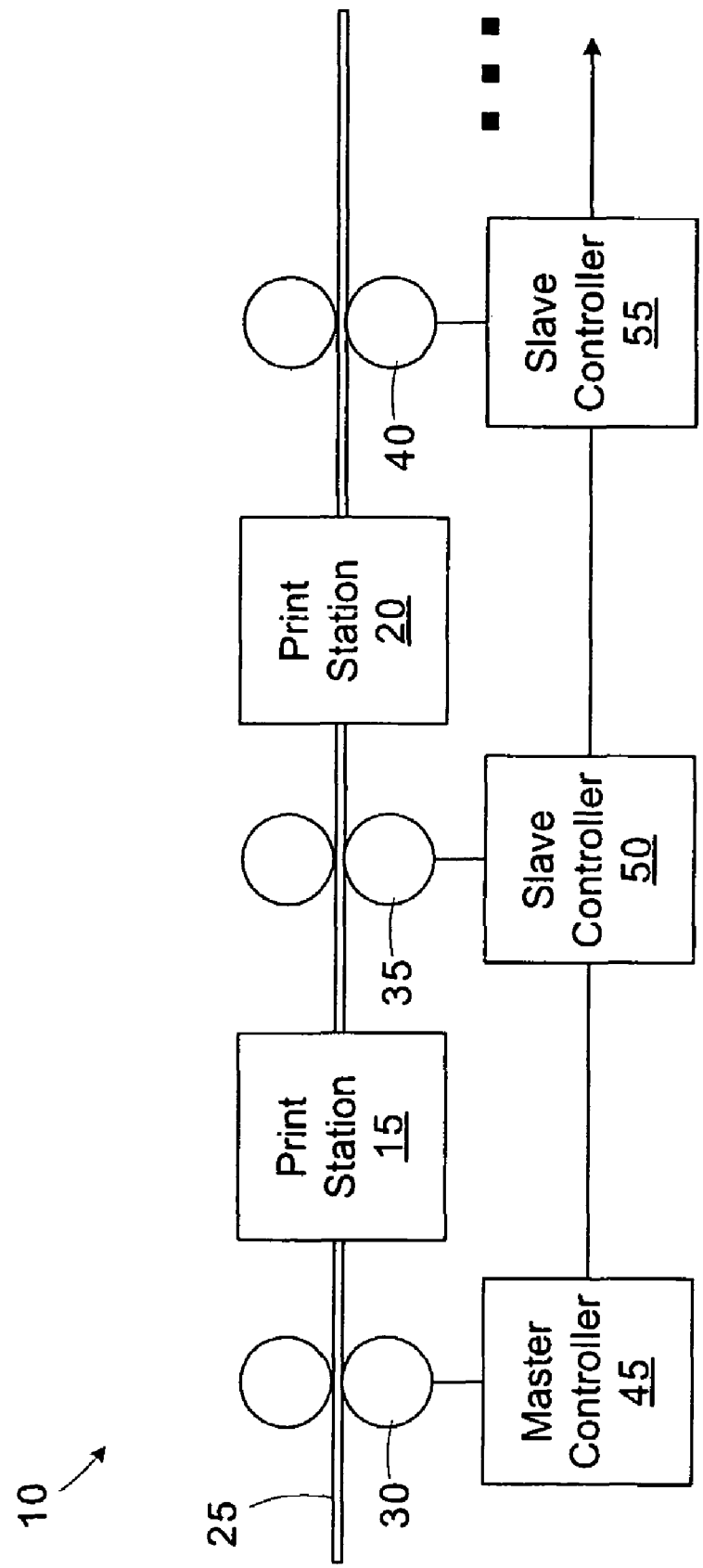
FIG. 1 is a simplified diagram of an electronic line shaft in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Referring now to the drawings wherein like reference numbers correspond to similar components throughout the several views and, specifically, referring to FIG. 1, the present invention shall be described in the context of an electronic line shaft 10. In the illustrated embodiment, the electronic line shaft 10 is employed to control a printing process, however, the application of the present invention is not limited to any particular process or application. The phrase "electronic line shaft" is intended to apply to any system in which two or more motors are controlled in a synchronized fashion to facilitate a process.

A plurality of print stations 15, 20, perform printing operations on a moving web, 25 (e.g., paper). The printing operations performed by the print stations 15, 20 may vary. For example, some printing systems print using 4 color print processes. Each print station 15, 20 prints a different color. Other print stations 15, 20 perform operations such as cutting, binding, folding, etc. Motor-driven rollers 30, 35, 40 move the web 25 through the print stations 15, 20. Although the rollers 30, 35, 40 are shown as being separate from the print stations 15, 20, in some embodiments, they may be integrated. Each motor-driven roller 30, 35, 40 has an associated controller 45, 50, 55, respectively. The controller 45 operates as a master controller and the controllers 50, 55 operate as slave controllers. The master controller 45 generates reference position and velocity data for the slave controllers 50, 55 so that synchronization may be achieved. Synchronization of the rollers 30, 35, 40 allows synchronization of the print stations 15, 20 to effectively perform the printing process.

Figure 2:
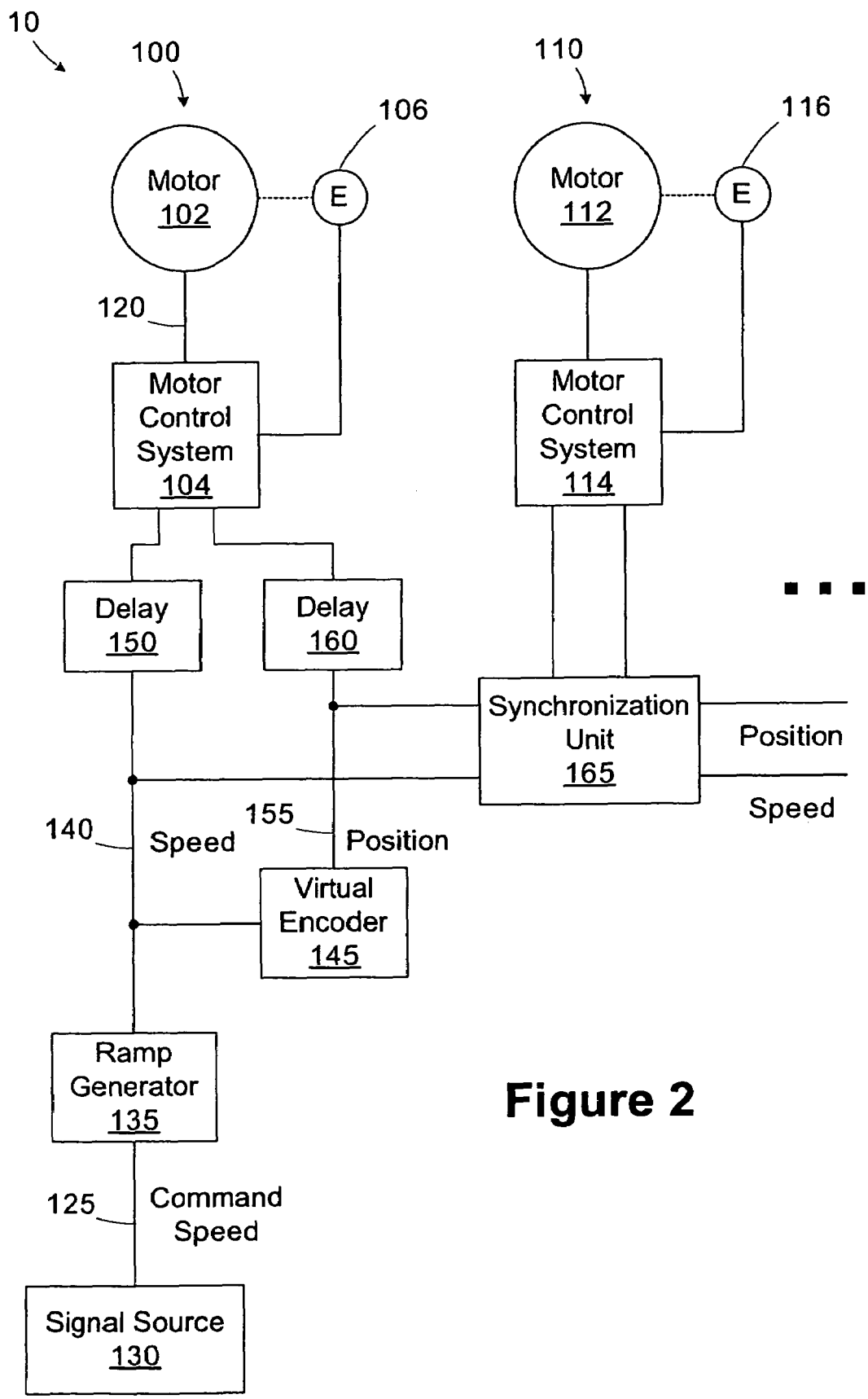
FIG. 2 is a simplified block diagram of the electronic line shaft of FIG. 1 from a control perspective.

Turning now to FIG. 2, a block diagram of the electronic line shaft 10 from a control perspective is provided. The electronic line shaft 10 includes a master drive 100 and one or more slave drives 110, only one of which is illustrated, a synchronization unit 165, a signal source 130, and a ramp generator 135. Drive 100 includes a motor 102, a motor control system 104, first and second delay elements 150 and 160, respectively, a virtual encoder 145, and an encoder 106. Slave drive 110 includes a motor 112, a motor control system 114 and an encoder 116. Motors 102, 112, motor control systems 104, 114, and encoders 106, 116 operate in similar fashions and therefore, to simplify this explanation, only motor 102, encoder 106, and motor control system 104 will be described here in any detail. Motor control system 104 generates appropriate voltages and control signals for controlling motor 102. Encoder 106 generates position information as motor 102 rotates. A plurality of radially displaced optical markings (not shown) are disposed about the periphery of a disk that rotates with the load (e.g., the rollers 30, 35, 40 in FIG. 1) associated with motor 102. Encoder 106 includes a scanner that identifies the passage of each marking to enable the determination of load position as described in more detail below.

Motor 102 receives a torque input signal 120 from the motor control system 104 and rotates the load at a reference velocity in response to the torque input signal 120. In general, the master drive 100 receives a command velocity signal 125 from signal source 130, and converts the command velocity signal into torque signals to drive motor 102. The torque signals are adjusted during operation based on factors such as a deviation between the feedback load position and reference load position, a deviation between the feedback velocity and reference velocity, and motor inertia that prevents the motor 102 from immediately reacting fully to a change in the torque input signal 120.

Referring still to FIG. 2, the signal source 130 may comprise any conventional device capable of receiving an input related to a reference velocity of motor rotation. The input can either be manually entered (e.g., via a man machine interface) or can be automatically provided to the signal source 130 via an automated control system. Ramp generator 135 receives the command velocity signal 125 from the signal source 130 and produces a reference velocity signal 140 that transitions or ramps up or down to the input command velocity signal 125. In this regard, the ramp generator 135 prevents abrupt changes in the speed command and, therefore, the torque command that is input to the motor 102 to reduce stress that would be experienced by the motor components if the torque signal were to abruptly change. The signal source 130 and ramp generator 135 may be collectively referred to as a signal generator.

During operation, when the command velocity signal 125 is applied to ramp generator 135, the ramp generator 135 determines the difference between the current command velocity signal 125 and the previous command velocity signal 125. The ramp generator 135 then determines a period of time necessary to transition the reference velocity signal 140 to a level corresponding to the command velocity signal 125. For example, the reference velocity signal 140 may be ramped linearly by the ramp generator 135, or may be ramped hyperbolically or in any other suitable manner that smoothly transitions the motor 102 to the command velocity signal 125.

The ramp generator 135 outputs the reference velocity signal 140 to virtual encoder 145 and to delay element 150. The virtual encoder 145 is virtual in that it is programmed in firmware of drive 100. The construction and operation of the virtual encoder 145 is described in greater detail in U.S. Pat. No. 6,850,021, issued Feb. 1, 2005, entitled, "PRECISION VIRTUAL ENCODER," commonly assigned to the assignee of the present application, and incorporated herein by reference in its entirety. In general, the virtual encoder 145 receives the reference velocity signal 140 from the ramp generator 135 and, based on a constant scale factor of the pulses per revolution of the motor 102 (e.g., 4096 pulses per revolution), integrates the input reference velocity signal 140. The virtual encoder 145 thus produces and outputs a reference position signal 155 that is an integer corresponding to an optical load marking count. The reference position signal 155 is provided to delay element 160. The reference velocity signal 140 and reference position signal 155 are also provided to synchronization unit 165 for communication to the slave drive 110 and any other slave drives in the electronic line shaft 10.

The outputs of delay elements 150 and 160 are provided as delayed velocity and position signals to motor control system 104. The reference velocity signal 140 and reference position signal 155 are delayed by the delay elements 150, 160 to provide sufficient time for the synchronization unit 165 to propagate the values to the slave drives 110 and their associated motor control systems 114 so that the master drive 100 and slave drives 110 may act on the control information in a synchronous fashion. The construction and operation of the synchronization unit 165 is described in greater detail in U.S. patent application Ser. No. 09/862,941, filed May 22, 2001, entitled, "APPARATUS FOR MULTI-CHASSIS CONFIGURABLE TIME SYNCHRONIZATION", U.S. patent application Ser. No. 09/862,256, filed May 22, 2001, entitled, "PROTOCOL AND METHOD FOR MULTI-CHASSIS CONFIGURABLE TIME SYNCHRONIZATION," and U.S. patent application Ser. No. 09/862,249, filed May 22, 2001, entitled, "SYSTEM AND METHOD FOR MULTI-CHASSIS CONFIGURABLE TIME SYNCHRONIZATION", each commonly assigned to the assignee of the present application and incorporated herein by reference in its entirety.

In general, the synchronization unit 165 generates a timing signal in conjunction with the reference position and velocity and provides them to the slave drives 110. Responsive to the timing signal, the motor control systems 104, 114 act on the data to compare the feedback velocity and position to the reference values and make control adjustments synchronously and accordingly. Thus, the delay elements 150, 160 in the motor control system 104 provide a functional time equivalent of the delay in the position and speed commands that are delivered by the synchronization unit 165 to the slave motor control systems 114.

Figure 3:
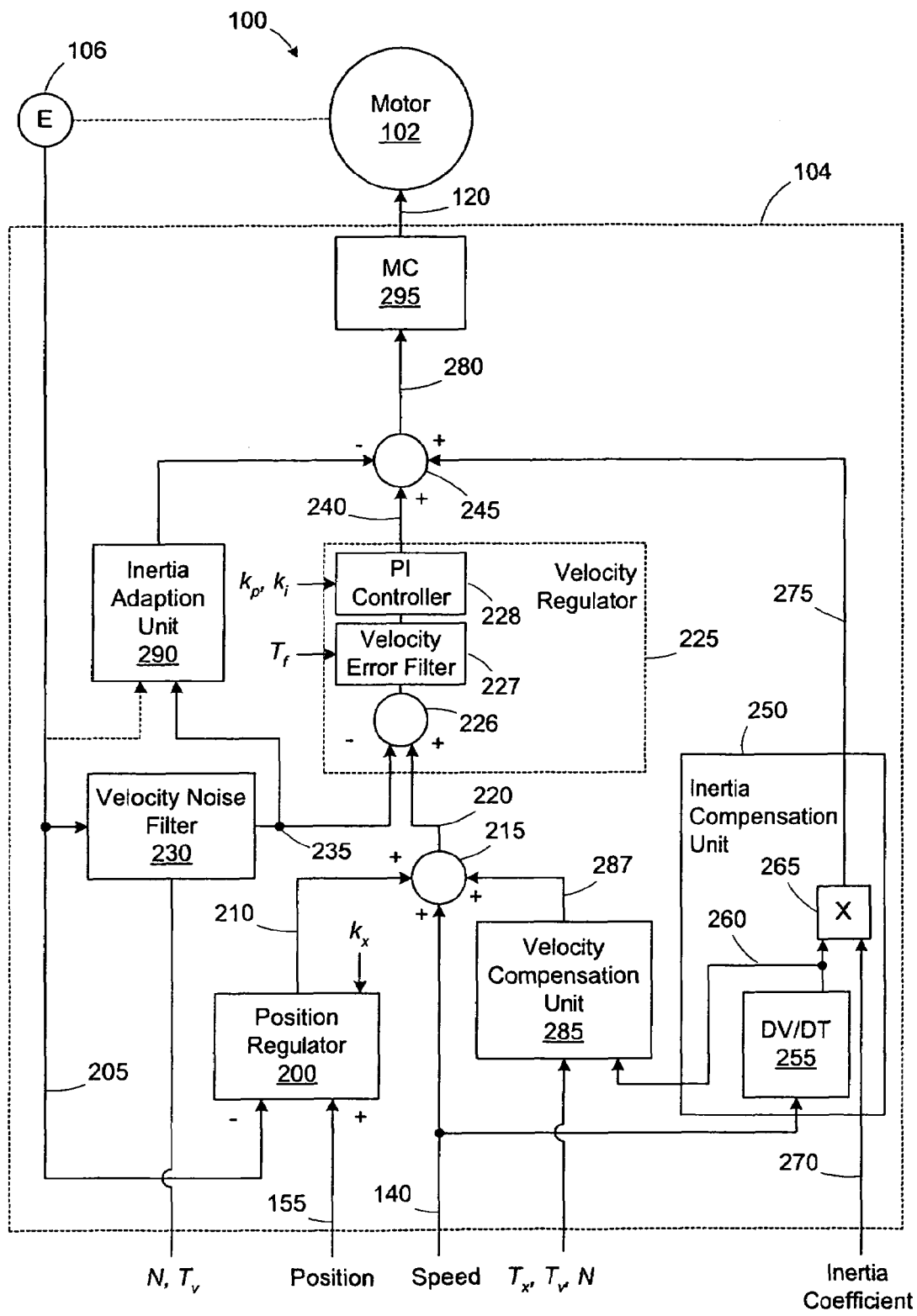
FIG. 3 is a block diagram of a motor control system in accordance with the present invention.

Turning now to FIG. 3, a simplified block diagram illustrating an exemplary motor control system 104 is provided. The operation of the motor control system 114 (see also FIG. 2) is similar, and is not described herein in the interest of simplifying this explanation. The motor control system 104 includes a position regulator 200 for controlling position errors, a velocity regulator 225 for controlling velocity errors, a velocity noise filter 230 for filtering position data to determine the velocity of the motor 102, an inertia compensation unit 250 for adjusting the control based on the expected inertial response of the motor 102, a velocity compensation unit 285 that affects the velocity control during periods of acceleration/deceleration, an inertia adaption unit 290 for generating acceleration feedback, first and second summers 215, 245 (i.e., adjustors), and a motor controller 295 that adjusts the torque input signal 120 applied to motor 102.

The reference position signal 155 is provided to the position regulator 200. The position regulator 200 also receives a feedback position signal 205 which reflects a measurement of the optical position count determined by the encoder 106. Position regulator 200 subtracts the feedback position signal 205 from the reference position signal 155 to generate a position error signal 210 corresponding to the error between the feedback position and reference position. The position error signal 210 is one component used to eventually determine the torque input signal 120 applied to the motor 102. In general, the velocity of the motor 102 is adjusted to correct the position error by adding a component to the velocity if the feedback position count trails the reference position and subtracting a component from the velocity if the feedback position count is greater than the reference position. In generating the position error signal, the position regulator 200 converts the count error to a per unit speed consistent with the reference velocity signal 140 by multiplying the count by a factor relating the seconds per edge of the encoder 106 at the base speed of the motor 102. The summer 215 receives the position error signal 210 and the reference velocity signal 140.

Referring still to FIG. 3, inertia compensation unit 250 includes a derivative module 255 and a multiplier 265. Derivative module 255 receives the reference velocity signal 140 and, as the label implies, determines the derivative of the reference velocity signal 140 output by the ramp generator 135 (i.e., ramp rate where the derivative is an acceleration signal 260). The acceleration signal 260 is provided to multiplier 265. Multiplier 265 also receives an inertia coefficient 270 related to the inertia of the motor 102 and load. Multiplier 265 multiplies the inertia coefficient 270 and the acceleration signal 260 to provide an inertia compensation signal 275 that is provided to summer 245.

Summer 245 adds the inertia compensation signal 275 to the velocity regulator output signal 240 to generate a net output signal 280 for adjusting the torque input signal 120 applied to motor 102.

The inertia compensation unit 250 is provided because changes in torque input signals 120 to motor 102 are resisted by the inertia of the motor 102, whether spinning or at rest. The inertia compensation signal 275 thus provides an additional signal that counteracts the inherent resistance of motor 102 and load to changes in velocity. It should be appreciated that when reference velocity signals 140 is decreasing, the derivative calculated by derivative module 255 is negative, thereby reducing the torque input signal 120 applied to motor 102. The inertia coefficient 270 is determined during the commissioning of the system and represents the time required to accelerate the inertia of the motor/load to base speed at rated torque.

Figure 6:
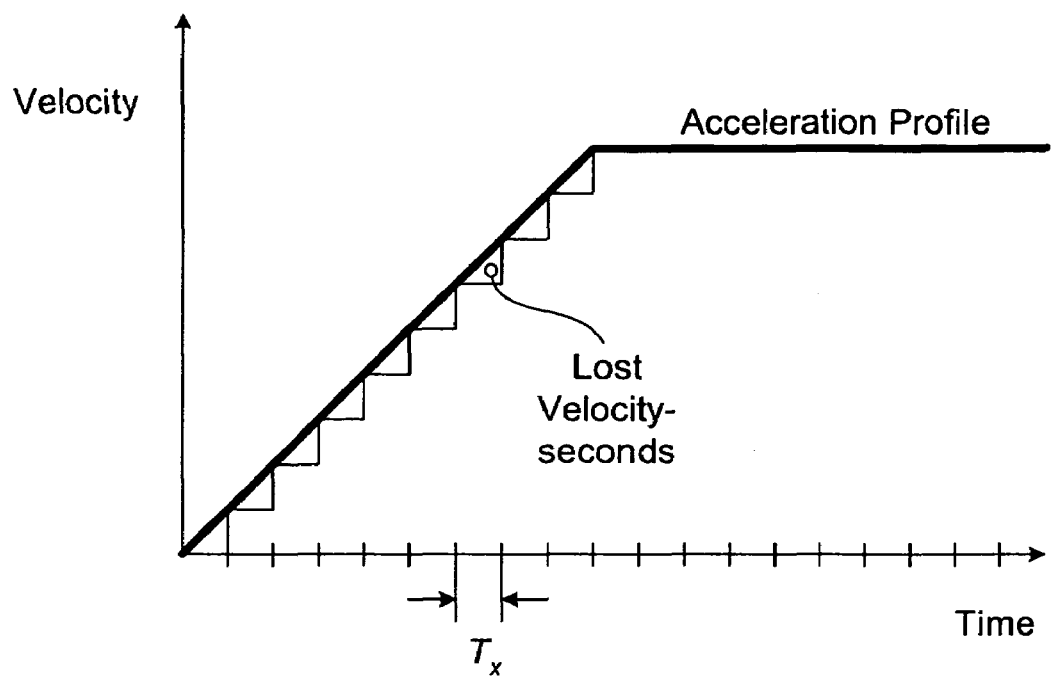
FIG. 6 is a prior art graph of velocity versus time during an acceleration event illustrating lost velocity-seconds.

Referring still to FIG. 3, the velocity compensation unit 285 receives the acceleration signal 260 and generates a velocity compensation signal 287 which is provided to summer 215. The operation of the velocity compensation unit 285 is discussed in greater detail below with reference to FIGS. 6 and 8.

Summer 215 adds signals 140, 210 and 287 and provides its output 220 to a summer 226 in the velocity regulator 225. The other input to the summer 226 in the velocity regulator 225 is provided by the velocity noise filter 230. Velocity noise filter 230 receives various input values, N and $T_v$, during a commissioning procedure and uses those values along with a feedback position signal 205 from encoder 106 to generate a feedback velocity signal 235. Operation of velocity noise filter 230 is described in greater detail below. The summer 226 in the velocity regulator 225 subtracts the feedback velocity signal 235 from the sum 220 output by summer 215 to generate an error signal. The error signal is filtered by a velocity error filter 227, and the filtered error signal is provided to a proportional-integral (PI) controller 228. The output of the PI controller 228 is a velocity regulator output signal 240 that corresponds to the difference between the sum 220 and the feedback velocity signal 235. The velocity regulator output signal 240 is provided to summer 245. As described in greater detail below, the velocity error filter 227 is coordinated to cooperate with the velocity noise filter 230 to attenuate the sideband components introduced by the velocity noise filter 230. The operation of the PI controller 228 for controlling the velocity error is well known to those of ordinary skill in the art, and in the interests of simplifying this description, is not detailed herein.

Still referring to FIG. 3, inertia adaption unit 290 generates an acceleration feedback component for inclusion by the summer 245 for adjusting the net output signal 280 provided to the motor controller 295. Inertia adaption unit 290 creates an electronic inertia of precise magnitude to minimize velocity regulator gain change when a mechanical inertia becomes disconnected from the motor. For instance, when using a gear-box or spring coupling at high frequencies. System stability is increased in such systems, especially when load inertia is much greater than motor inertia. The inertia adaption unit 290 may not be used in some embodiments. Typically, the inertia adaption unit 290 is not used if the system inertia is<3 times the motor inertia. The inertia adaption unit 290 may be used if there is a gear-box and/or spring coupling with a resonant frequency in the range of 30 to 200 Hz, or if the desired velocity bandwidth exceeds two thirds of the maximum bandwidth divided by the inertia ratio. The construction and operation of the inertia adaption unit 290 is described in greater detail in U.S. patent application Ser. No. 10/662,556, filed Sep. 15, 2003, entitled, "METHOD AND APPARATUS FOR PROVIDING OPTIMAL ACCELERATION FEEDBACK," commonly assigned to the assignee of the present application, and incorporated herein by reference in its entirety.

Referring to FIG. 3, the inertia adaption unit 290 may be configured to receive the feedback velocity signal 235 from the velocity noise filter 230 for determining the acceleration feedback, or alternatively, the inertia adaption unit 290 may receive the unfiltered position data from the encoder 106 (i.e., as indicated by the dashed line) and calculate an instantaneous velocity using the last two position values and the time interval between the values.

The motor controller 295 adjusts the torque input signal 120 based on variations between feedback and reference position, feedback and reference velocity, and inertia effects, as described above. The construction and operation of the motor controller 295 are known and not described in greater detail herein.

With continued reference to FIG. 3, the operation of the velocity noise filter 230 and velocity error filter 227 are now described in greater detail. From a noise perspective the velocity noise filter 230 and velocity error filter 227 are in series. In general, the velocity noise filter 230 is a finite impulse response (FIR) filter performing a moving average function using $N=2^n$ data points to determine a velocity value. The value of n may represent a noise index and may be configured in the drive firmware to provide differing filter responses. The velocity error filter 227 is an infinite impulse response (IIR) that attenuates sidebands of the FIR velocity noise filter 230.

Referring again to FIGS. 2 and 3, in general, encoder 106 detects and counts the passage of optical markings present on a disk that rotates along with the rotating load during operation. In one embodiment, the encoder 106 may employ a two channel system that outputs pulse trains corresponding to detections of the optical markings. Phase differences between the pulse trains from each channel may be used to determine motor direction. An edge detection circuit receives both pulse trains and generates an edge signal that includes a peak for every rising and falling edge of the pulse train for each channel. Hence, four successive peaks would represent a rising edge of the A channel, a rising edge of the B channel, a falling edge of the A channel, and a falling edge of the B channel.

Figure 4:
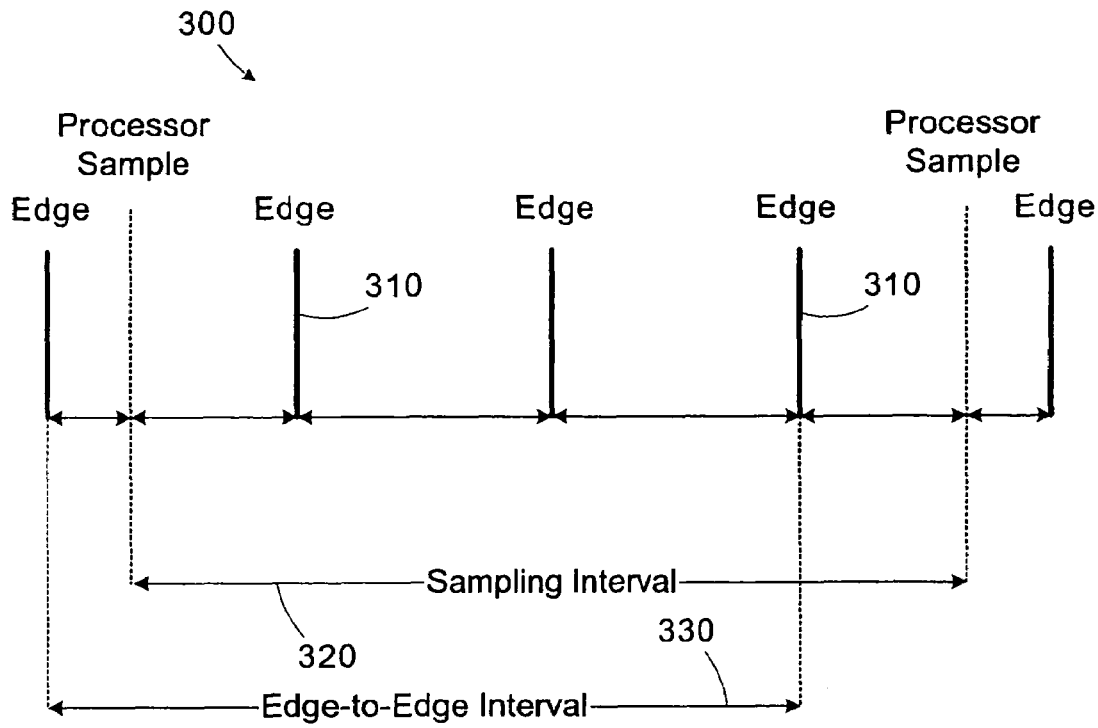
FIG. 4 is a diagram illustrating an edge signal generated from an encoder output useful for determining motor position and velocity.

FIG. 4 illustrates an exemplary edge signal 300 generated by the encoder 106. This particular encoder 106 implementation is provided for illustrative purposes only. Other types of position feedback devices may be used. In FIG. 4, the edge signal includes a plurality of edges 310 representing rising and falling edges of the signal generated by the encoder 106.

The position is sampled at the frequency indicated by sampling interval 320. The edge-to-edge time (i.e., the time between four edges or the time between subsequent rising edges of the A channel signal) is represented by the edge-to-edge interval 330. Note that the position is sampled in the time period between edges. An edge timer, which is reset with the receipt of every edge, may be used to track the time elapsed since the last edge so that the edge signal may be aligned to the last edge for accurate velocity determination. Thus, a position counter and edge timer may be sampled concurrently to accurately determine the number of edges that occurred during the current sampling interval as well as the precise time at which the edges occurred.

Referring again to FIG. 3, the velocity noise filter 230 multiplies the number of edges counted during the sampling interval, d_edge, by an edge scaling factor, edge_scale, and divides by time interval, d_time to generate a velocity value for the current sample:

$$\text{Velocity} = d\_edge * (edge\_scale/d\_time) \quad (1)$$

The edge scaling factor is based on the associated amount of motor travel for each edge detected. For instance, if the encoder 106 generates 4096 edges per revolution, and the motor base speed is 1750 rpm, the edge scaling factor is 60/4096/1750 sec/edge or $8.371*10^{-6}$ at motor base speed. The resulting motor velocity calculation from Equation 1 is unitless, such that a velocity of 1.0=motor base speed. The time interval, d_time varies depending on the value selected for n. The variable, d_time, represents the edge-to-edge interval 330 shown in FIG. 4, or the change in time measured over a $2^n$ moving average interval. Every sample interval, the velocity noise filter 230 is updated with two new values, pulse_count, and a time variable.

Sampling interval, d_edge, is the difference between the latest moving average pulse_count array element and a previously stored element, measured over the selected $2^n$ average interval. Similarly, time interval, d_time, is the difference between the latest time variable value, clk_edge, and a previously stored time variable value, clk_edge, measured over the same time interval. Sampling interval, d_edge, therefore represents the number of new encoder edges or the change in the pulse_count value that occurred over the selected average interval. Similarly, time interval d_time is the change in time, measured from the first to last encoder edge, for the same sampling interval, d_edge, and average interval.

Various types of position feedback devices may be used, such as the encoder described above, a high resolution encoder, or a resolver, and the application of the present invention is not limited to any particular position feedback device. The velocity noise filter 230 operates on accumulated position and outputs a near ideal velocity value that is band-limited.

An exemplary transfer function for the velocity noise filter 230, independent of the position feedback device type, can be expressed as:

$$G(Z) = \frac{1 - Z^{-N}}{T_v N} \quad (2)$$

where: N=number of taps, typically ranging from 1 to 256 in powers of two,
$T_v$=sample time of the filter, and
$Z=\exp(sT_v)$ By configuring the number of taps, N, in the velocity noise filter 230, the bandwidth and anticipated noise level is controllable. In general, the bandwidth decreases as the number of taps increases and lower bandwidth reduces noise level. Noise is thus reduced by increasing N.

The velocity error filter 227 is implemented using a second order IIR filter. An exemplary transfer function for the filter 227 can be expressed as:

$$G(s) = \frac{1}{(1 + T_f s)^2} \quad (3)$$

where $T_f$=filter time constant in seconds. A higher order filter is contemplated and may be employed in some embodiments. The velocity error filter 227 attenuates high frequency sidebands of the FIR velocity noise filter 230. The bandwidth of the velocity error filter 227 is typically set at a multiple of the bandwidth of the noise bandwidth determined by the velocity noise filter 230. For instance, the bandwidth of the velocity error filter 227 may be set at 6 times the noise bandwidth determined by the velocity noise filter 230. Other multiples, such as between about 3 and 9, or other values may be used. For example, in embodiments where the inertia adaption unit 290 is enabled, the bandwidth of the velocity error filter 227 may be set at 3 times the selected velocity bandwidth. A particular example relating the bandwidth of the velocity error filter 227 to the noise bandwidth is shown below in Table 1.

Figure 5:
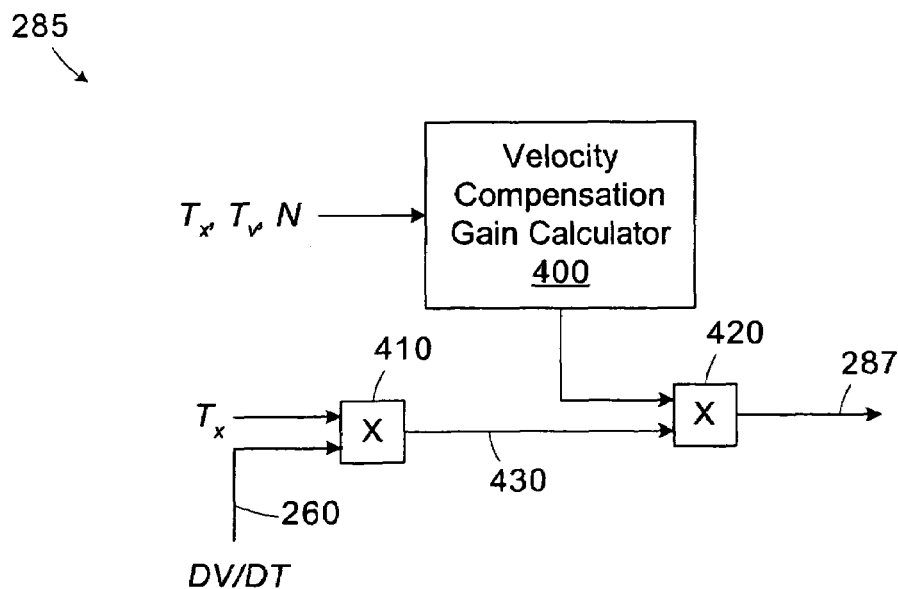
FIG. 5 is a block diagram of a velocity compensation unit in the motor control system of FIG. 3.

Turning now to FIG. 5, a simplified block diagram of the velocity compensation unit 285 of FIG. 3 is provided. The velocity compensation unit 285 includes a velocity compensation gain calculator 400 and two multipliers 410, 420 cooperating to generate the feed forward velocity compensation signal 287.

Referring again to FIG. 3, in the illustrated embodiment, position regulator 200 and velocity regulator 225 operate at different update intervals. $T_x$ represents the interrupt interval of the position regulator 200, and $T_v$ represents the interrupt interval of the velocity regulator 225. In the illustrated embodiment, the reference velocity signal 140 is over-sampled at a rate 4 times that of the reference position signal 155, so $T_x = 4T_v$. Other sampling rate arrangements are contemplated, including no oversampling, a higher level of oversampling, or a lower level of oversampling.

Velocity compensation unit 285 receives the sample time of velocity regulator 225 ($T_v$), the sample time of the position regulator 200 ($T_x$) and the time delay of the velocity noise filter 230 (i.e., based on N), during a commissioning procedure. In addition, compensation unit 285 receives the acceleration signal 260 (DV/DT) from the derivative module 255. However, in an embodiment without inertia compensation, the derivative module 255 may be incorporated into compensation unit 285.

Multiplier 410 multiplies the acceleration signal 260 by the position regulator sample time $T_x$. Multiplier 420 then multiplies the output of multiplier 410 by a velocity compensation gain factor, Vcomp_gain, generated by the velocity compensation gain calculator 400 to generate the velocity compensation signal 287 that is, in turn, provided as an input to summer 215 shown in FIG. 3.

Figure 7:
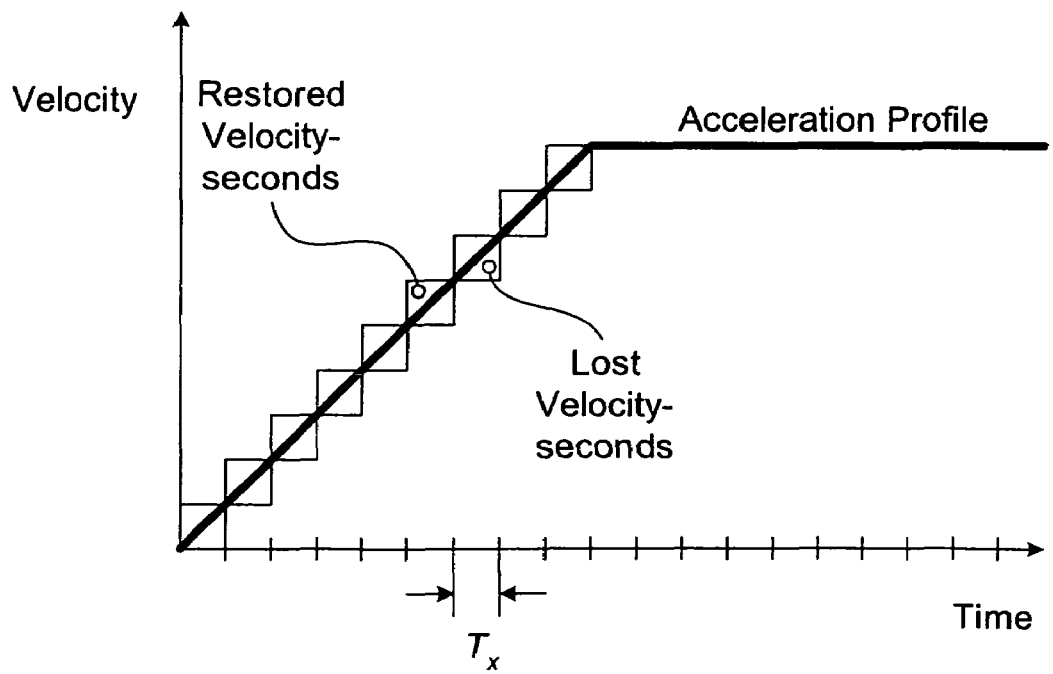
FIG. 7 is a graph of velocity versus time during an acceleration event illustrating lost velocity-seconds and velocity-seconds restored in accordance with the present invention.

To illustrate operation of velocity compensation unit 285, a simple example is described in which the velocity noise filter has one tap (i.e., n=0, $N=2^0=1$). The value of Vcomp_gain is normalized to unity when n=0. The output 260 of the derivative module 255 and $T_x$(sec) are multiplied by multiplier 410 to generate an intermediate velocity compensation signal 430. Note that in steady state, the value of intermediate velocity compensation signal 430 is zero because the value output by derivative module 255 is zero (i.e., no acceleration). When accelerating, the velocity compensation signal 287 restores an increment of velocity-seconds lost to the sample and hold process, as illustrated in FIG. 7. The velocity compensation unit 285 uses a feed forward compensation technique to anticipate the velocity seconds that are lost due to the discrete position samples and restore the lost velocity-seconds. Restoring lost velocity-seconds of the proper level secures an ideal correction and a near zero position error at the time of interrupt. The compensation provided by the velocity compensation signal 287 results in a reduced position error, thus reducing the observable performance difference between steady state and acceleration/deceleration periods of operation.

The velocity noise filter 230 imparts a delay that varies depending on the number of taps, N. It is known that delays through an FIR filter can be made precisely linear by design. Because the velocity noise filter 230 is linear in the illustrated embodiment, the filter delay is precisely known and can be factored into the compensation calculation of the velocity compensation gain calculator 400. The velocity noise filter 230 is run at the same sampling rate as the velocity regulator 225, $T_v$, at a task frequency that is an exact multiple of the position regulator 200. The velocity noise filter 230 could also be run at the same rate. In terms of timing, the velocity tasks could be performed after the position regulator 200 (i.e., $T_v$ after $T_x$) or before the position regulator 200 (i.e., $T_v$ before $T_x$). The timing relationships are predetermined. In either case, a precise formula can be applied via velocity compensation gain calculator 400 to restore lost velocity-seconds. The formula for Vcomp_gain where the velocity task is performed prior to the position task is:

$$\text{Vcomp\_gain} = 1 - \left[\frac{T_v}{T_x} \cdot \frac{(N-1)}{2}\right] \quad (4)$$

The formula for Vcomp_gain where the position task is performed prior to the velocity task is:

$$\text{Vcomp\_gain} = 1 - \left[\frac{T_v}{T_x} \cdot \frac{(N+1)}{2}\right] \quad (5)$$

Returning to FIG. 2, the reference velocity signal 140 and reference position signal 155 are sent to other the slave drives 110 controlling motors 112 that are to be operated synchronously with the motor 102. It should be appreciated in this regard that the master drive 100 sends signals to a plurality of slave drives 110. The cooperation between the master drive 100 and the slave drives 110 ensure that all motors operate at the same velocity and at the same position, and that adjustments are made to correct position errors when a feedback position of a given motor does not equal the reference position of the motor. Accordingly, only one virtual encoder is necessary for a system operating a plurality of synchronously controlled motors.

Figure 8A:
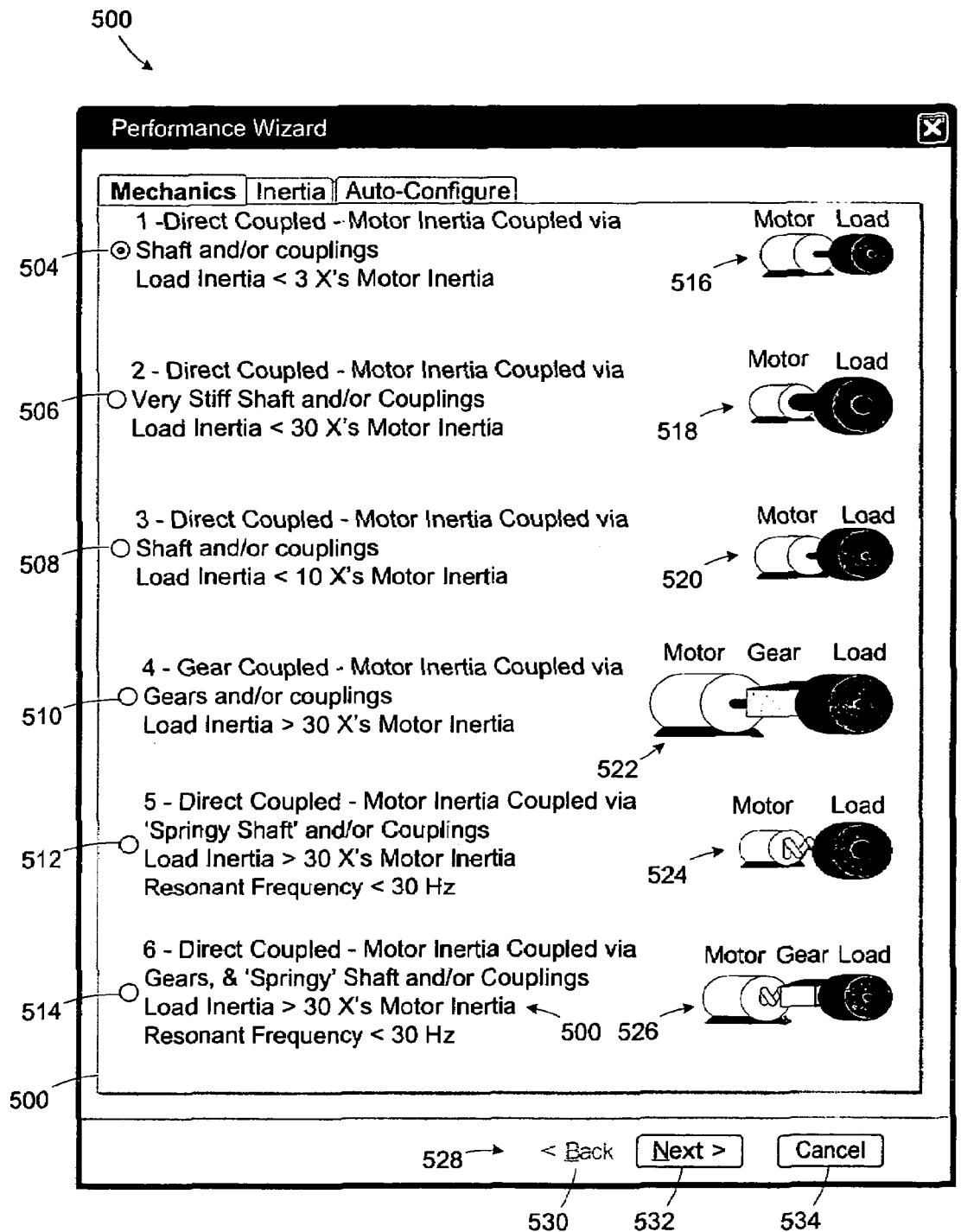
FIGS. 8A, 8B, and 8C are diagrams of a wizard for configuring control parameters of the motor drive of FIG. 3.
Figure 8B:
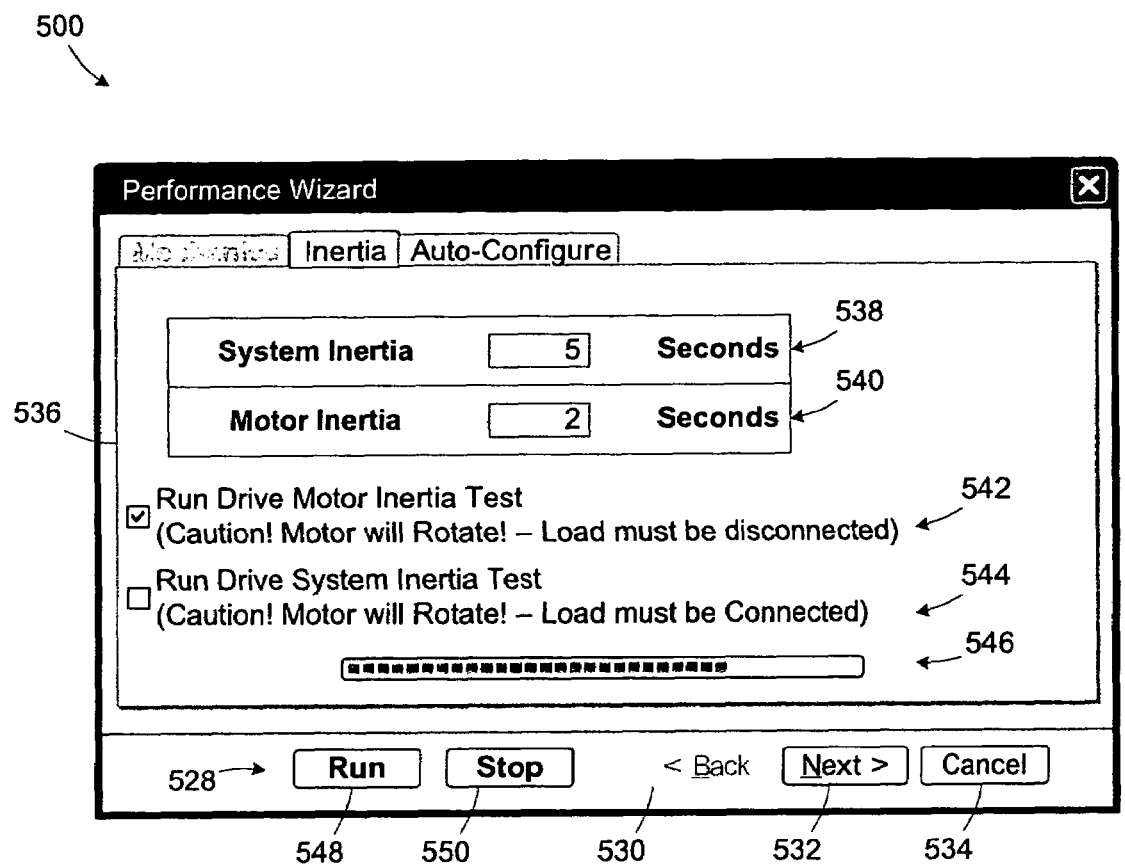
Figure 8C:
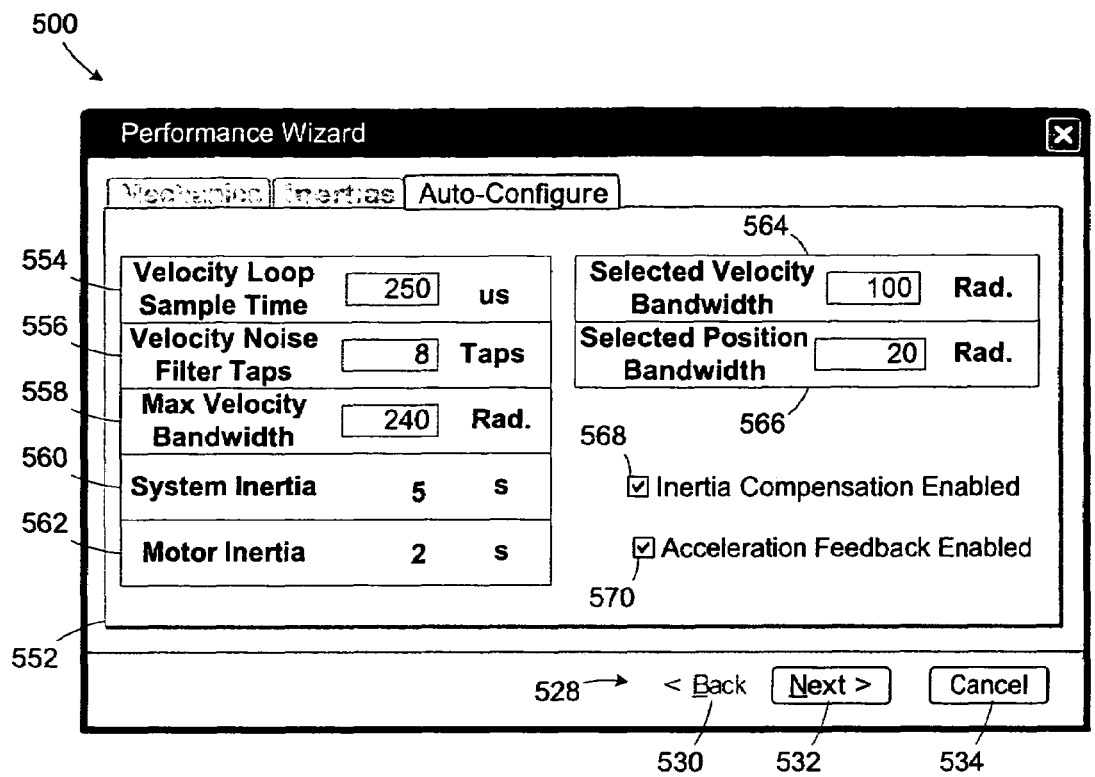

Turning now to FIGS. 8A, 8B, and 8C, screen displays of a wizard 500 for configuring the control parameters of the motor control system 10 are shown. In general, the wizard 500 collects application information from a user and automatically generates recommended values for various control parameters, such as the number of taps in the velocity noise filter 230, the bandwidth of the velocity error filter 227, the gain constants used in the PI controller 228, the enabling of the inertia compensation unit 250, and the enabling of the inertia adaption unit 290 (all shown in FIG. 3).

Referring first to FIG. 8A, a mechanics panel 502 in the wizard 500 is displayed. Using the mechanics panel 502, a user specifies the general characteristics of the drive 100, 110. The mechanics panel 502 provides multiple arrangement selections 504, 506, 508, 510, 512, and 514, and associated arrangement graphics 516, 518, 520, 522, 524, and 526. Control buttons 528, such as a back button 530, next button 532, and cancel button 534 are provided for navigating within or exiting the wizard 500. As described in greater detail below, the wizard 500 generates control parameters for the motor control system 104 based on the selections.

The arrangement specified by selection 504 and graphic 516 relates to a direct coupled system where the load inertia is less than about 3 times the motor inertia. The arrangement specified by selection 506 and graphic 518 relates to a direct coupled system with a very stiff shaft and/or couplings and a load inertia less than about 30 times the motor inertia. The graphic 518 illustrates the stiff shaft and large load to motor inertia ratio. Selection 508 and graphic 520 illustrates a direct coupled arrangement where the load inertia is less than about 10 times the motor inertia.

Selection 510 and graphic 522 relate to a gear coupled arrangement employing a gearbox between the motor and the load, where the load inertia is greater than about 30 times the motor inertia. Selections 512, 514 and associated graphics 524, 526 relate to arrangements with springy shafts coupling the motor to the load (i.e., selection 524) or to a gearbox (i.e., selection 526). The load inertia is less than about 30 times the motor inertia, and the resonant frequency is greater than about 30 Hz for selections 512 and 514.

The particular configurations illustrated by selections 504, 506, 508, 510, 512, and 514, and associated graphics 516, 518, 520, 522, 524, and 526 are illustrative, and not exhaustive. Other coupling arrangements, shaft types, inertia ratios, etc. may be used.

Following the general specification of the system arrangement using the mechanics panel 502, the user may transition to the inertia panel 536 illustrated in FIG. 8B. The inertia panel 536 includes a system inertia field 538, a motor inertia field 540, a motor inertia test checkbox 542, a system inertia checkbox 544, and a status indicator 546. The control buttons 528 on the inertia panel 536 further included a run button 548 and a stop button 550.

Values for the system inertia and motor inertia may be input manually into the system inertia field 538 and the motor inertia field 540, or they may be determined automatically using a commissioning procedure. The commissioning tests may be performed by selecting one of the motor inertia test checkbox 542 and the system inertia checkbox 544 and activating the run button 548. The test may be terminated using the stop button 550. The motor inertia test is performed with the load disconnected and the system inertia test is performed with the load connected. The system inertia represents the time required the motor and load to base speed with 100% applied torque, and the motor inertia represents the time required to accelerate the motor to base speed and rated torque. Commissioning procedures for determining the system and motor inertias are well known to those of ordinary skill in the art, and they are not described in detail here in the interest of simplifying the description.

Referring to FIGS. 8A and 8B, the wizard 500 may verify the mechanics selection chosen in the mechanics panel 502 based on the determined system and motor inertias to verify proper selection. For example, if the load inertia is greater than 3 times the motor inertia, and selection 504 was chosen in the mechanics panel 502 (i.e., load<3× motor), the wizard 500 may recommend that the selection be changed to selection 508 (i.e., load<10× motor).

After inputting the inertias or running the automatic inertia tests, the next button 532 may be selected to transition the wizard 500 to the auto-configure panel 552 shown in FIG. 8C. The auto-configure panel 552 includes a velocity loop sample time field 554, a velocity noise filter taps field 556, a maximum velocity bandwidth field 558, a system inertia field 560, a motor inertia field 562, a selected velocity bandwidth field 564, a selected position bandwidth field 566, an inertia compensation checkbox 568, and an acceleration feedback checkbox 570.

The automatic configuration of the motor control system 104 is now described with reference to FIGS. 3 and 8C. In the illustrated embodiment, the sample time of the velocity loop specified in the velocity loop sample time field 554 is 250 microseconds (i.e., 4000 Hz). The following example is based on this sample time. Of course, the velocity loop sample time may vary depending on the particular implementation.

the amount of phase shift at constant gain to cause instability. The sideband attenuation provided by the velocity error filter 227 corresponds to a first sideband peak amplitude of less than about 0.015 of fundamental to provide a suitable level of stop-band attenuation. The attenuation factor for the velocity error filter may be defined by the equation:

$$AF = \frac{\frac{2}{3\pi}}{1 + \left(\frac{3\pi f_v}{N\omega_f}\right)^2} \tag{6}$$

where $\omega_f$ is the bandwidth of the velocity error filter 227 (i.e., $2\pi/t_f$), $f_v$ is the velocity sample frequency, and N is the number of taps in the velocity noise filter 230. Values for the velocity error filter 227 bandwidth based on the number of taps in the velocity noise filter 230 are also shown below in Table 1.

TABLE 1

Bandwidth Table

| BW | N | | | | | | | |
|---|---|---|---|---|---|---|---|---|
| | 1 | 2 | 4 | 8 | 16 | 32 | 64 | 128 |
| Noise bandwidth (r/s) | 690 | 530 | 380 | 240 | 120 | 60 | 30 | 15 |
| Velocity Error filter (r/s) | 4100 | 3200 | 2200 | 1300 | 600 | 300 | 150 | 75 |
| Sideband Attenuation Factor | .0025 | 0.006 | 0.011 | 0.015 | 0.013 | 0.013 | 0.013 | 0.013 |

Based on the mechanics of the system specified in the mechanics panel 502 of FIG. 8A, the wizard 500 determines the number of taps used for the velocity noise filter 230, as specified in the velocity noise filter taps field 556. In general, system arrangements with gear boxes tend to exhibit increased noise, and the number of taps for such systems is increased. The wizard 500 constrains the value of the velocity noise filter taps field 556 such that the value is a power of 2 (i.e., 1, 2, 4, 8, 16, 32, 64, 128).

Based on the determined value for the number of taps used in the velocity noise filter 230, the wizard 500 determines the corresponding noise bandwidth and filter coefficient for the velocity error filter (see Equation 3 above). Table 1 below illustrates the noise bandwidth corresponding to the number of taps based on the velocity sampling frequency of 4000 Hz and a current regulator setting of 2000 radians/sec. As is known in the art, the current regulator is implemented by the motor controller 295 to regulate the drive voltages provided to the motor 102 based on the torque input signal 280.

Table 1 also indicates the bandwidth of the velocity error filter 227. In determining the relationship between the noise bandwidth and the velocity error filter bandwidth, the velocity error filter bandwidth was selected from a set of bode response curves to provide a gain margin of at least about 10 db at the velocity noise bandwidth and a phase margin of at least about 1 radian at the velocity noise bandwidth. The gain margin is defined as the amount of gain increase at constant phase to cause instability, and the phase margin is defined as The noise bandwidth generally sets the upper limit on the velocity bandwidth that may be used by the velocity regulator 225. The user selects a value for the velocity bandwidth in the selected velocity bandwidth field 564 that is less than the value of the maximum velocity bandwidth field 558 (i.e., which corresponds to the noise bandwidth determined in Table 1). The position bandwidth specified in the selected position bandwidth field 566 is typically about ⅓ to ⅕ of the velocity bandwidth. The wizard 500 may suggest the value for the selected position bandwidth field 566 based on the value of the selected velocity bandwidth field 564, or it may allow the user to enter both values 564, 566.

The values of the system inertia field 560 and a motor inertia field 562 are transferred from the corresponding fields 538, 540 from the inertia panel 536 shown in FIG. 8B. The wizard 500 sets the value of the inertia coefficient 270 used by the inertia compensation unit 250 of FIG. 3 equal to the value of the system inertia field 560. The wizard 500 may also act as the velocity compensation gain calculator 400 (see FIG. 5) and set the value of the inertia compensation gain factor based on the velocity and position sampling times, velocity versus position sampling precedence, and number of taps, as defined by one of Equations 4 or 5 above.

Still referring to FIGS. 3 and 8C, the wizard 500 sets the gain constants used by the position regulator 200 and the PI controller 228 in the velocity regulator 225 based on the selected position and velocity bandwidths 566, 564, respectively. The wizard 500 sets the proportional gain, $k_x$, used by the position regulator 200 equal to the value of the selected position bandwidth (PBW) field 566 (i.e., $k_x$=PBW). The wizard 500 sets the proportional gain, $k_p$, used by the PI controller 228 to the value of the system inertia ($I_s$) field 560 times the value of the selected velocity bandwidth (VBW) field 564:

$$k_p = I_s * VBW \quad (7)$$

The wizard 500 sets the value of the proportional gain, $k_i$, used by the PI controller 228 to the value of $k_p$ times the value of the selected velocity bandwidth field 564 divided by 4:

$$k_i = \frac{k_p * VBW}{4} \quad (8)$$

Turning back to FIG. 8A, the wizard 500 determines whether to enable the inertia compensation unit 250 and/or the inertia adaption unit 290 (i.e., acceleration feedback) via the inertia compensation checkbox 568 and acceleration feedback checkbox 570, respectively. The wizard 502 stores flags for inertia adaption and compensation associated with each of the selections 504-514 on the mechanics panel 502 of FIG. 8A. The user may override the wizard's recommendations by manually checking or unchecking the checkboxes 568, 570.

In general, inertia adaption is selected in applications where the mechanical load inertia may become disconnected from the motor 102, such as when a gear-box or spring coupling is used at high frequencies, especially when load inertia is much greater than motor inertia. For example, selections 510, 512, and 514 in the mechanics panel 502 of FIG. 8A exhibit such characteristics.

In general, inertia compensation is employed in situations where the load inertia is significantly larger than the motor inertia, such as with selections 506, 508, 510, 512, and 514 in the mechanics panel 502.

In applications employing inertia adaption or compensation, the required number of taps, N, for the velocity noise filter 230 may be decreased. Hence, if the user manually selects or deselects inertia compensation or acceleration feedback using the inertia compensation checkbox 568 or acceleration feedback checkbox 570, the wizard 500 may recommend that the number of taps for the velocity noise filter 230 specified by the velocity noise filter taps field 556 be changed accordingly. For instance, if the wizard recommended 32 taps and did not enable inertia compensation and adaption, and the user manually selected one or both of the inertia processing techniques, the wizard 500 may recommend decreasing the number of taps to 8.

In summary, the wizard 500 collects system information from the user and chooses the number of taps for the velocity noise filter 230 accordingly. The wizard 500 also recommends whether inertia compensation or adaption should be used based on the specified system arrangement. The wizard 500 directs the user to perform inertia tests to determine the system and load inertias. The noise bandwidth derived from on the number of taps determines the upper limit for the velocity bandwidth. The wizard 500 determines the filter coefficient for the velocity error filter 227 based on the noise bandwidth. The user then selects a velocity bandwidth typically less than the noise bandwidth. The position bandwidth may be selected by the user or recommended by the wizard 500. Based on the velocity and position bandwidths, the wizard 500 configures the controller gain constants employed in the position regulator 200 and the velocity regulator 225. The wizard 500 may also provide additional recommendations responsive to changes by the user that override the wizard's initial recommendations, such as recommending a different number of taps based on user changes to the inertia processing techniques.

The following example illustrates the selection of the noise index n, and the subsequent configuration of the motor control system 104 for the exemplary system mechanics arrangements described with reference to FIG. 8A. Again, the specific mechanical arrangements are merely illustrative, and an actual implementation may include different arrangements. Moreover, the following configuration examples are also merely illustrative, and may vary depending on the particular characteristics of an actual implementation.

The following examples illustrate the selection of the noise index, n, and the enabling of the inertia adaption unit 290 for each of the selections 504-514 shown in FIG. 8A. Unless otherwise noted, the velocity bandwidth is selected at a value less than the noise bandwidth shown in Table 1, and the position bandwidth is set at about ⅓ to ⅕ of the velocity bandwidth. The gain constants for the position regulator 200 and the velocity regulator 225 are set based on the selected position and velocity bandwidths as described above. The velocity compensation gain factor is set in accordance with Equation 4 or 5, as described above based on the number of taps, N, configured for the velocity noise filter 230 based on the noise index. In general, it is useful to increase or decrease n as necessary to attain minimal mechanical noise, with goal of keeping n as high as possible within the constraints of the desired velocity bandwidth. The selection of a noise index that is too low may result in system chatter.

Selection 1: Direct coupled—Motor Inertia coupled via shaft and/or couplings. Load Inertia<3× motor inertia.

For this arrangement, the inertia adaption unit 290 is disabled, as acceleration feedback is not necessary for the relatively low inertia ratio. The noise index, n, is set to 4, resulting in 16 taps in the velocity noise filter 230. The value of 4 for the noise index represents a default value and is suitable for velocity bandwidths up to around 100 (r/s). The noise bandwidth is prescribed by the Table 1 value based upon number of taps (16), or 120 radians/sec. The maximum velocity bandwidth field 558 is limited to this value. If the implementation requires a higher velocity bandwidth, the noise index may be decreased to 3 or 2 to increase the noise bandwidth, and thus the maximum velocity bandwidth.

Selection 2: Direct coupled—Motor Inertia is coupled via very stiff shaft and/or coupling. Load inertia<30× motor inertia.

Because of a higher system inertia than Selection 1, n may in this case be set to 5. Generally, systems with high inertias do not need high velocity bandwidths and can benefit from a higher degree of filtering. The maximum velocity bandwidth field 558 is limited to 60 Radians, so as to not exceed the noise bandwidth in Table 1.

For this selection, the inertia adaption unit 290 is disabled, because the load is still considered part of the motor from an inertia standpoint, and the resonant frequency is sufficiently high (e.g., above 200 Hz) to reduce the effectiveness of the inertia adaption unit 290. The value of the noise index, n, is set to 5, resulting in 32 taps for the velocity noise filter 230. Typically, such systems with high reflected inertia do not require high velocity bandwidths. Again, if a higher velocity bandwidth is needed for a particular implementation, the value of the noise index may be reduced.

Selection 3: Direct coupled—motor inertia coupled via shaft and/or couplings. Load inertia<10× motor inertia.

In this arrangement, the inertia adaption unit 290 is disabled, because the system is considered sufficiently stiff (i.e., resonant frequency>200 Hz). In an actual implementation, if it is determined that the system is not as stiff as first thought, the settings for selection 5 below may be used. A value of 4 is selected for the noise index. In this arrangement, the selected velocity bandwidth may be configured to exceed the noise bandwidth to a limited extent (e.g., by about 20%).

Selection 4: Gear Coupled—motor inertia coupled via gears and/or couplings. Load Inertia>30× motor inertia.

For this selection, the inertia adaption unit 290 is enabled because the high level of inertia will exhibit considerable compliance and noise in the mechanical transmission. The inertia adaption unit 290 is configured to receive the position feedback directly from the encoder 106, thus decoupling the inertia adaption unit 290 from the velocity noise filter 230. This decoupling allows the system to use aggressive noise filtering for the velocity regulator 225 due to the relatively high inertia. The velocity bandwidth is selected based on the inertia ratio, and the value of the noise index is selected to achieve a noise bandwidth that is greater than velocity bandwidth. In this arrangement, the required velocity bandwidth drives the selection of the noise bandwidth, and determines the allowable aggressiveness of the velocity noise filter 230. The inertia adaption filter bandwidth is set to 1× the selected velocity bandwidth. The bandwidth of the velocity error filter 227 is set to about 3× the selected velocity bandwidth.

Selection 5: Direct coupled—motor inertia coupled via weak "springy" shaft. Load inertia>30× motor inertia.

For this arrangement, the inertia adaption unit 290 is enabled. Typically, inertia adaption is used with gears or "springy" couplings. The velocity bandwidth, noise index, and velocity error filter bandwidth are set as described in the previous example.

Selection 6: Direct Coupled—motor inertia coupled via gears, and weak "springy" shaft and/or couplings. Load inertia>30× motor inertia.

This selection is configured as with selection 5 above. For purposes of inertia adaption a spring and a gear-box require similar handling.

Figure 9:
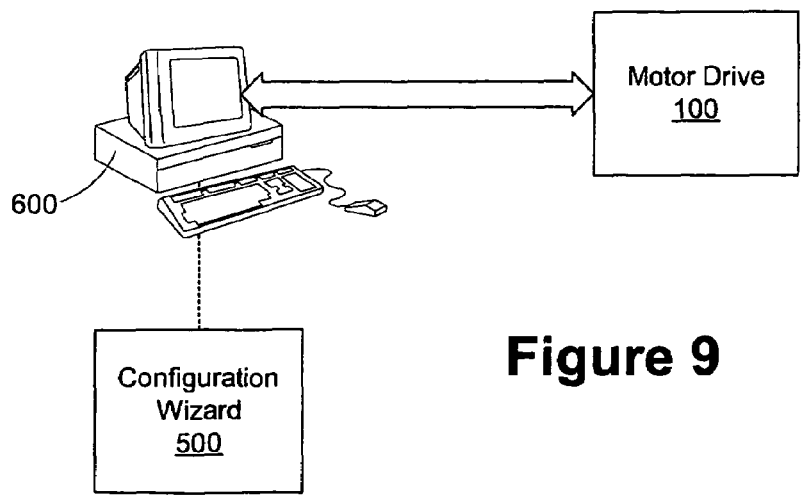
FIG. 9 is a simplified block diagram illustrating the wizard of FIGS. 8A-8C interfacing with the motor drive of FIG. 3.

Turning now to FIG. 9, a simplified diagram of the wizard 500 interfacing with the motor drive 100 is provided. The wizard 500 is implemented as a software application executed by general-purpose or specialized processing device 600 (e.g., a desktop computer, notebook computer, or workstation). The processing device 600 is coupled to the motor drive 100 via a communications link 610. The communications link 610 may employ hard-wired (e.g., Ethernet) or wireless (e.g. 802.11) connections, for example. The communication link 610 may employ standard or proprietary network protocols for communication between the wizard 500 and the motor drive 100.

Returning to FIG. 3, the wizard 500 automatically configures the motor control system 104 based on relatively simple configuration data provided by the user. As a result, the user can configure the system without having detailed knowledge of motor control theory. Hence, the wizard 500 simplifies the configuration process and increases the consistency of the results. Even if some degree of tuning is desired depending on a particular application, the wizard 500 allows the tuning to be conducted at a relatively high level. For instance, the user may wish to experiment with different values of noise bandwidth (i.e., by changing N) or different velocity bandwidths. The wizard 500 allows the user to change the high level parameter and automatically changes the detailed control parameters affected by the change (e.g., velocity error filter bandwidth, velocity compensation gain factor, controller gain constants, etc.). This arrangement simplifies the tuning process for the user.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. An electronic line shaft, comprising:
   a motor drive; and
   a processing unit operable to execute a wizard for configuring the motor drive, the wizard being operable to receive mechanical characteristic data associated with the motor drive that is provided as input by a wizard user, determine a noise parameter based on the mechanical characteristic data, and determine at least one control parameter of the motor drive based on the noise parameter;
   wherein the motor drive comprises an inertia compensation unit operable to receive a reference velocity signal, generate a derivative of the reference velocity signal, and multiply the derivative by an inertia compensation gain factor to generate an inertia compensation signal, and an adjustor operable to adjust the reference velocity signal as a function of the inertia compensation signal, and the wizard is operable to receive a system inertia parameter and determine the inertia compensation gain factor as a function of the system inertia parameter.

2. The electronic line shaft of claim 1, wherein the noise parameter comprises a noise index.

3. The electronic line shaft of claim 1, wherein the motor drive comprises a velocity noise filter coupled to receive a feedback position signal and operable to filter the feedback position signal to generate a feedback velocity signal, and the control parameter comprises a number of taps in the velocity noise filter.

4. The electronic line shaft of claim 3, wherein the motor drive further comprises a velocity regulator having a first adjuster operable to receive the feedback velocity signal and a reference velocity signal and compare the reference velocity signal and the feedback velocity signal to generate a velocity error signal and a velocity error filter operable to filter the velocity error signal, and the wizard is operable to determine a bandwidth of the velocity error filter as the control parameter based on the number of taps.

5. The electronic line shaft of claim 3, wherein the motor drive further comprises a velocity compensator operable to receive a reference velocity signal, determine a derivative of the reference velocity signal, and multiply the derivative by a velocity compensation gain factor to generate a velocity compensation signal, and the wizard is operable to determine the velocity compensation gain factor as the control parameter based on the number of taps.

6. An electronic line shaft, comprising:
   a motor drive; and
   a processing unit operable to execute a wizard for configuring the motor drive, the wizard being operable to receive mechanical characteristic data associated with the motor drive that is provided as input by a wizard user, determine a noise parameter based on the mechanical characteristic data, and determine at least one control parameter of the motor drive based on the noise parameter;

wherein the motor drive further comprises an inertia adaption unit operable to receive a feedback velocity signal and generate a feedback acceleration signal based on the feedback velocity signal, and the wizard is operable to enable or disable the inertia adaption unit based on the mechanical characteristic data.

7. The electronic line shaft of claim 6, wherein the motor drive further comprises:
an inertia compensation unit operable to receive a reference velocity signal, generate a derivative of the reference velocity signal, and multiply the derivative by an inertia compensation gain factor to generate an inertia compensation signal; and
an adjustor operable to adjust the reference velocity signal as a function of the inertia compensation signal,
wherein the wizard is operable to receive a system inertia parameter, determine the inertia compensation gain factor as a function of the system inertia parameter, and adjust the inertia compensation gain factor responsive to the enabling of the inertia adaption unit.

8. The electronic line shaft of claim 7, wherein the wizard is operable to determine increase the inertia compensation gain factor by a factor of about 50% responsive to the enabling of the inertia adaption unit.

9. An electronic line shaft, comprising:
a motor drive; and
a processing unit operable to execute a wizard for configuring the motor drive, the wizard being operable to receive mechanical characteristic data associated with the motor drive that is provided as input by a wizard user, determine a noise parameter based on the mechanical characteristic data, and determine at least one control parameter of the motor drive based on the noise parameter;
wherein the motor drive comprises a velocity noise filter coupled to receive a feedback position signal and operable to filter the feedback position signal to generate a feedback velocity signal, and the control parameter comprises a number of taps in the velocity noise filter and the drive unit further comprises a velocity regulator including:
a first adjuster operable to receive the feedback velocity signal and a reference velocity signal and compare the reference velocity signal and the feedback velocity signal to generate a velocity error signal; and
a controller operable to generate a velocity regulator output signal as a function of the velocity error signal and at least one controller gain constant,
wherein the wizard is operable to receive a selected velocity bandwidth and determine the controller gain constant as a function of the selected velocity bandwidth.

10. The electronic line shaft of claim 9, wherein the wizard is operable to determine a noise bandwidth based on the number of taps in the velocity noise filter, set the noise bandwidth as a maximum velocity bandwidth, and limit the selected velocity bandwidth to a value less than the maximum velocity bandwidth.

11. The electronic line shaft of claim 9, wherein the controller gain constant comprises at least one of a proportional gain constant and an integral gain constant.

12. An electronic line shaft, comprising:
a motor drive; and
a processing unit operable to execute a wizard for configuring the motor drive, the wizard being operable to receive mechanical characteristic data associated with the motor drive that is provided as input by a wizard user, determine a noise parameter based on the mechanical characteristic data, and determine at least one control parameter of the motor drive based on the noise parameter;
wherein the motor drive comprises a velocity noise filter coupled to receive a feedback position signal and operable to filter the feedback position signal to generate a feedback velocity signal, and the control parameter comprises a number of taps in the velocity noise filter and the drive unit further comprises a position regulator operable to receive the position feedback signal and a reference position signal and generate a position error signal as a function of the reference position signal, the feedback position signal, and a at least one controller gain constant, and the wizard is operable to receive a selected position bandwidth and determine the controller gain constant as a function of the selected position bandwidth.

13. A method for configuring a motor drive, the motor drive further includes an inertia compensation unit operable to receive a reference velocity signal, generate a derivative of the reference velocity signal, and multiply the derivative by an inertia compensation gain factor to generate an inertia compensation signal, and an adjustor operable to adjust the reference velocity signal as a function of the inertia compensation signal, the method comprising the steps of:
providing a wizard for entering user input including mechanical characteristic data associated with the motor drive;
receiving the mechanical characteristic data;
determining a noise parameter based on the mechanical characteristic data;
determining at least one control parameter of the motor drive based on the noise parameter;
determining a system inertia parameter; and
determining the inertia compensation gain factor as a function of the system inertia parameter.

14. The method of claim 13, wherein determining the noise parameter further comprises determining a noise index.

15. The method of claim 13, wherein the motor drive includes a velocity noise filter coupled to receive a feedback position signal and operable to filter the feedback position signal to generate a feedback velocity signal, and determining the control parameter further comprises determining a number of taps in the velocity noise filter.

16. The method of claim 15, wherein the motor drive further includes a velocity regulator having a first adjuster operable to receive the feedback velocity signal and a reference velocity signal and compare the reference velocity signal and the feedback velocity signal to generate a velocity error signal and a velocity error filter operable to filter the velocity error signal, and determining the control parameter further comprises determining a bandwidth of the velocity error filter based on the number of taps.

17. The method of claim 15, wherein the motor drive further includes a velocity compensator operable to receive a reference velocity signal, determine a derivative of the reference velocity signal, and multiply the derivative by a velocity compensation gain factor to generate a velocity compensation signal, and determining the control parameter further comprises determining the velocity compensation gain factor based on the number of taps.

18. A method for configuring a motor drive, the motor drive including an inertia adaption unit operable to receive a feedback velocity signal and generate a feedback acceleration signal based on the feedback velocity signal, the method comprising the steps of:

provide a wizard for entering user input including mechanical characteristic data associated with the motor drive;

receiving the mechanical characteristic data;

determining a noise parameter based on the mechanical characteristic data;

determining at least one control parameter of the motor drive based on the noise parameter; and enabling or disabling the inertia adaption unit based on the mechanical characteristic data.

19. The method of claim 18, wherein the motor drive further includes an inertia compensation unit operable to receive a reference velocity signal, generate a derivative of the reference velocity signal, and multiply the derivative by an inertia compensation gain factor to generate an inertia compensation signal, and an adjustor operable to adjust the reference velocity signal as a function of the inertia compensation signal, and the method further comprises:

determining a system inertia parameter;

determining the inertia compensation gain factor as a function of the system inertia parameter; and adjusting the inertia compensation gain factor responsive to the enabling of the inertia adaption unit.

20. The method of claim 19, wherein adjusting the inertia compensation gain factor further comprises increasing the inertia compensation gain factor by a factor of about 50% responsive to the enabling of the inertia adaption unit.

21. A method for configuring a motor drive, wherein the motor drive includes a velocity noise filter coupled to receive a feedback position signal and operable to filter the feedback position signal to generate a feedback velocity signal, and determining the control parameter further comprises determining a number of taps in the velocity noise filter and the motor drive further includes a velocity regulator having a first adjuster operable to receive the feedback velocity signal and a reference velocity signal and compare the reference velocity signal and the feedback velocity signal to generate a velocity error signal, and a controller operable to generate a velocity regulator output signal as a function of the velocity error signal and at least one controller gain constant, the method comprising the steps of:

providing a wizard for entering user input including mechanical characteristic data associated with the motor drive, receiving the mechanical characteristic data;

determining a noise parameter based on the mechanical characteristic data; and determining at least one control parameter of the motor drive based on the noise parameter;

receiving a selected velocity bandwidth; and determining the controller gain constant as a function of the selected velocity bandwidth.

22. The method of claim 21, further comprising:

determining a noise bandwidth based on the number of taps in the velocity noise filter;

setting the noise bandwidth as a maximum velocity bandwidth; and limiting the selected velocity bandwidth to a value less than the maximum velocity bandwidth.

23. The method of claim 22, wherein determining the controller gain constant comprises determining at least one of a proportional gain constant and an integral gain constant.

24. A method for configuring a motor drive, wherein the motor drive includes a velocity noise filter coupled to receive a feedback position signal and operable to filter the feedback position signal to generate a feedback velocity signal, and determining the control parameter further comprises determining a number of taps in the velocity noise filter and the motor drive further includes a position regulator operable to receive the position feedback signal and a reference position signal and generate a position error signal as a function of the reference position signal, the feedback position signal, and a at least one controller gain constant, the method comprising the steps of:

providing a wizard for entering user input including mechanical characteristic data associated with the motor drive;

receiving the mechanical characteristic data;

determining a noise parameter based on the mechanical characteristic data; and determining at least one control parameter of the motor drive based on the noise parameter;

receiving a selected position bandwidth; and determining the controller gain constant as a function of the selected position bandwidth.

* * * * *